(12) United States Patent
Liu et al.

(10) Patent No.: US 9,981,190 B2
(45) Date of Patent: May 29, 2018

(54) TELEMETRY BASED INTERACTIVE CONTENT GENERATION

(71) Applicant: Microsoft Technology Licensing, LLC, Redmond, WA (US)

(72) Inventors: Alex Liu, Duvall, WA (US); Sebastian Grinke, Kirkland, WA (US); Robert Chase Jones, Bellevue, WA (US); Kenneth A. Lobb, Sammamish, WA (US); James Yarrow, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 430 days.

(21) Appl. No.: 14/723,282

(22) Filed: May 27, 2015

(65) Prior Publication Data

US 2016/0346696 A1 Dec. 1, 2016

(51) Int. Cl.
| | |
|---|---|
| G06F 15/173 | (2006.01) |
| A63F 13/67 | (2014.01) |
| H04L 12/803 | (2013.01) |
| A63F 13/355 | (2014.01) |
| A63F 13/69 | (2014.01) |
| A63F 13/795 | (2014.01) |

(Continued)

(52) U.S. Cl.
CPC ............ *A63F 13/67* (2014.09); *A63F 13/355* (2014.09); *A63F 13/40* (2014.09); *A63F 13/69* (2014.09); *A63F 13/795* (2014.09); *A63F 13/847* (2014.09); *H04L 47/125* (2013.01)

(58) Field of Classification Search
USPC ...................................................... 463/16–43
See application file for complete search history.

(56) References Cited

U.S. PATENT DOCUMENTS

| | | | |
|---|---|---|---|
| 7,211,000 B2 * | 5/2007 | Jutzi | A63F 13/12 |
| | | | 273/317 |
| 7,680,038 B1 * | 3/2010 | Gourlay | H04L 41/0896 |
| | | | 370/230 |
| 8,600,926 B2 | 12/2013 | Flinn et al. | |

(Continued)

OTHER PUBLICATIONS

Hastings, et al., "Automatic Content Generation in the Galactic Arms Race Video Game", In IEEE Transactions on Computational Intelligence and AI in Games, vol. 1, Issue 4, Dec. 2009, 19 pages.

(Continued)

*Primary Examiner* — Masud Ahmed
(74) *Attorney, Agent, or Firm* — Klarquist Sparkman, LLP

(57) ABSTRACT

Techniques are described for performing telemetry based interactive content generation for online services. For example, telemetry data can be obtained from individual users of the online service and/or from multiple users of the online service (e.g., and processed to generate aggregate telemetry data). Other types of data can also be obtained, including service management data. Service management data can be generated from the users of the online service and can comprise user density information for virtual areas of the online service. Using telemetry data (e.g., user-specific telemetry data and/or aggregate telemetry data), service management data, and/or other types of data related to the online service, new interactive experiences can by dynamically created for the users of the online service.

18 Claims, 9 Drawing Sheets

(51) Int. Cl.
*A63F 13/847* (2014.01)
*A63F 13/40* (2014.01)

(56) References Cited

U.S. PATENT DOCUMENTS

| | | | | |
|---|---|---|---|---|
| 8,651,961 | B2* | 2/2014 | Muller | A63F 13/35 |
| | | | | 463/42 |
| 8,753,183 | B2* | 6/2014 | Davison | A63F 13/335 |
| | | | | 463/1 |
| 8,874,725 | B1* | 10/2014 | Ganjam | H04L 43/0817 |
| | | | | 709/224 |
| 8,882,582 | B2 | 11/2014 | Avent et al. | |
| 9,549,043 | B1* | 1/2017 | Stoica | H04L 67/32 |
| 2006/0121989 | A1 | 6/2006 | O'Kelley et al. | |
| 2007/0117635 | A1* | 5/2007 | Spanton | A63F 13/12 |
| | | | | 463/43 |
| 2012/0245715 | A1* | 9/2012 | Short | A63F 13/35 |
| | | | | 700/91 |
| 2014/0248960 | A1 | 9/2014 | Zalewski | |
| 2016/0314315 | A1* | 10/2016 | Krogius | G06F 21/577 |

OTHER PUBLICATIONS

"Level Design, Implying a Path to the Player", Published on: Jul. 24, 2011 Available at: http://gamedev.stackexchange.com/questions/13452/level-design-implying-a-path-to-the-player.

Pagulayan, et al., "User-Centered Design in Games", In Publication of the Human-Computer Interaction Handbook, Jan. 1, 2002, 46 pages.

Stringer, et al., "Player-Centred Game Design: Player Modelling and Adaptive Digital Games", In Proceedings of Digital Games Research Conference, Changing Views: Worlds in Play, Jun. 16, 2005, 14 pages.

"Blood Life Legends™ and Tully's Treasure Hunt", Retrieved on: Mar. 24, 2015 Available at: http://media.igt.com/marketing/PromotionalLiterature/GamePromoLit_1D848-20A5B.pdf.

Paolis, et al., "Otranto in the middle Ages: a Serious Game for the Edutainment", In International Journal of Information and Education Technology, vol. 1, No. 1, Apr. 2011, pp. 47-57.

Nasr, et al., "Methods for Game User Research", In IEEE Computer Graphics and Applications, vol. 33, Issue 4, Jul. 2013, pp. 82-87.

* cited by examiner

SOFTWARE 780 IMPLEMENTING DESCRIBED TECHNOLOGIES

TELEMETRY BASED INTERACTIVE CONTENT GENERATION

BACKGROUND

Online services provide content for users to experience. However, online services are typically developed with a set of defined interactive experiences. Once a user has engaged in the set of defined interactive experiences, there may be nothing left to keep the user engaged with the online service.

In order to try to keep users engaged with an online service, developers can create new interactive experiences. However, manually creating new interactive experiences for the online service can be expensive in terms of manpower, time, and money. Therefore, there exists ample opportunity for improvement in technologies related to creating interactive experiences for online services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for performing telemetry based interactive content generation for online services. For example, telemetry data can be obtained from individual users of the online service and/or from multiple users of the online service (e.g., and processed to generate aggregate telemetry data). Other types of data can also be obtained, including service management data. Service management data can be generated from the users of the online service and can comprise user density information for virtual areas of the online service. Using telemetry data (e.g., user-specific telemetry data and/or aggregate telemetry data), service management data, and/or other types of data related to the online service, new interactive experiences can by dynamically created for the users of the online service. The new interactive experiences can be dynamically created without manual intervention and without a developer having to create new content for the online service.

As described herein, a variety of other features and advantages can be incorporated into the technologies as desired.

DETAILED DESCRIPTION

Overview

Figure 1:
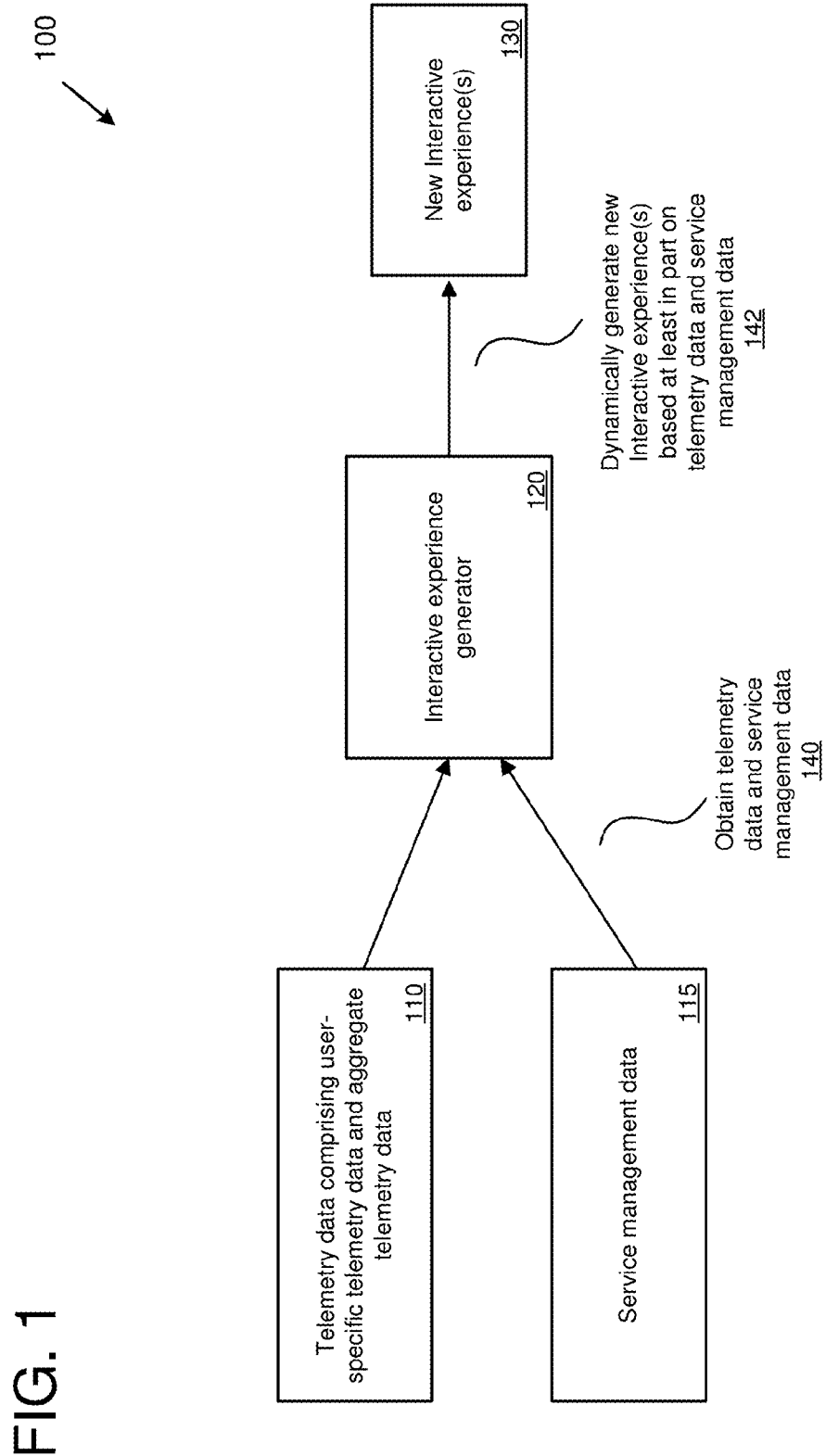
FIG. 1 is a diagram depicting example components and operations for telemetry based interactive content generation.

As described herein, various technologies are described for performing telemetry based interactive content generation for online services. For example, telemetry data can be obtained from individual users of the online service and/or from multiple users of the online service (e.g., and processed to generate aggregate telemetry data). Other types of data can also be obtained, including service management data. Service management data can be generated from the users of the online service and can comprise user density information for virtual areas of the online service. Using telemetry data (e.g., user-specific telemetry data and/or aggregate telemetry data), service management data, and/or other types of data related to the online service, new interactive experiences can by dynamically created for the users of the online service.

In some implementations, a combination of telemetry data is used in dynamically generating new interactive experiences. The combination includes telemetry data that is collected from individual users of the online service (also called user-specific telemetry data). For example, the user-specific telemetry data can be generated from activity performed by the specific user when using the online service (e.g., by monitoring and collecting actions performed by the specific user). The combination also includes aggregate telemetry data that is generated from multiple users of the online service. For example, the aggregate telemetry data can be generated from activity performed by multiple users when using the online service (e.g., by monitoring, collecting, and aggregating activity performed by the multiple users when using the online service).

In some implementations, service management data is used in dynamically generating new interactive experiences for the online service (e.g., along with a combination of telemetry data). For example, the service management data can include data related to various aspects of the online service, such as user density information (e.g., population information for virtual areas of the online service), which aspects of the online service are being used (or not used) by the users, load balancing information for the online service, server utilization information, etc.

Using the telemetry data and the service management data (and in some implementations other data as well), new interactive experiences can by dynamically created for the users of the online service. For example, the new interactive experiences can be created dynamically in order to introduce new activities for the users to perform in the online service without the need for a developer to create new content for the online service. For example, an online service can be provided with a set of interactive experiences (e.g., a predefined set of activities). In order to provide a rich experience for the users of the online service, new interactive experiences can be dynamically created to supplement or expand the original set of interactive experiences.

Dynamically creating new interactive experiences can result in savings in terms of time and resources. For example, instead of having developers (e.g., software developers) create new content or new interactive experiences for the online service (e.g., new activities to perform), new interactive experiences can be created dynamically, and without manual intervention, by using the telemetry data and the service management data. Dynamically creating new interactive experiences can also result in savings in terms of computing resources. For example, the new interactive experiences can be created such that resources (e.g., network bandwidth resources, processor resources, memory resources, or storage resources) are utilized more efficiently (e.g., by load balancing users across servers). Furthermore, the technologies described herein for dynamically creating new interactive experiences can result in improvements in the technology area of providing an online service via a computer network to many users simultaneously (e.g., by load balancing users across servers).

In some implementations, the technologies described herein are applied to improve the performance and functionality of online video games in which multiple users (players) participate in the online video game. For example, an online video game involving multiple players can be set in a game world (a virtual game world) in which the players perform actions (e.g., complete quests) in a game world environment (e.g., a science fiction or fantasy game setting) Online video games (also called online computer games or online console games) in which multiple players participate simultaneously in a persistent shared game world environment are also called multiplayer online games (e.g., massively multiplayer online games (MMOs)).

For example, new unique quests can be dynamically generated using telemetry data (e.g., user-specific telemetry data generated from user activities performed in a virtual game world of the online video game and/or aggregate telemetry data generated from the activity of multiple users in the virtual game world), game management data (e.g., player load balancing information for the virtual game world, in-game asset utilization, etc.), and/or other information related to the online video game (e.g., narrative goals and game world state).

New unique quests can be created dynamically in order to provide additional activities for users to perform. For example, an online video game can be provided with a set of quests (e.g., pre-defined set of quests). Once a user has completed the initial set of quests for the online video game, the user may have little left to do in the game. In order to provide a rich experience for the users of the online video game, new unique quests can be dynamically created to supplement or expand the original set of quests.

Dynamically creating new unique quests can result in savings in terms of time and resources. For example, instead of having developers (e.g., software developers) create new content (e.g., downloadable content (DLC)) for the online video game, new unique quests can be created dynamically, and without manual intervention, by using telemetry data, game management data, and/or other data. Dynamically creating new unique quests can also result in savings in terms of computing resources. For example, the new unique quests can be created such that resources (e.g., network bandwidth resources, processor resources, memory resources, or storage resources) are utilized more efficiently (e.g., by load balancing users across servers). Furthermore, the technologies described herein for dynamically creating new unique quests can result in improvements in the technology area of providing an online video game via a computer network to many users simultaneously (e.g., by load balancing users across servers).

Telemetry Data

In the technologies described herein, telemetry data for an online service can include user-specific telemetry data that is specific to a particular user of the online service and/or aggregate telemetry data this is generated from multiple users of the online service.

In an online video game environment, telemetry data can include user-specific telemetry data that is generated from a specific user of the online video game. For example, user-specific telemetry data can be generated from activities that the player performs in the online video game (e.g., what types of creatures the player likes to kill, what types of resources the player likes to farm, what areas of the game world the player likes to visit, what types of weapons or equipment the player uses, what types of quests the player likes to complete, etc.). User-specific telemetry data can also be generated from player attributes, such as the items in the player's inventory or items that the user needs.

Telemetry data can also include aggregate telemetry data that is generated from multiple users of the online video game. For example, aggregate telemetry data can be generated from activities that the players perform in the online video game (e.g., aggregate data representing the types of creates players like to kill, types of resources players like to farm, areas of the game world that players visit, types of weapons or equipment that are used, quests that players complete, etc.). Aggregate telemetry data can also be generated from attributes of the players, such as inventory items.

Dynamic Interactive Content Generation Examples

In the technologies described herein, new interactive experiences are dynamically created based at least in part on telemetry data. For example, new interactive experiences can be created based on telemetry data obtained from a particular user and/or based on telemetry data obtained from a group of users (e.g., aggregate telemetry data generated from a community of users of an online service).

In some implementations, new unique quests are dynamically generated for an online video game. For example, new unique quests can be dynamically created by defining various attributes of the new unique quests including location attributes, action attributes, narrative or motivation attributes, and reward attributes.

In one example scenario, new unique quests are dynamically generated for an online video game that takes place in a virtual game world (e.g., a persistent virtual game world) of the online video game. For example, consider a particular user of the online game that has not yet visited a particular location in the virtual game world (e.g., a particular desert location). In addition, assume that the particular user is motivated to obtain particular items in the online game (e.g., a more powerful sword for example). Using this telemetry data, new interactive content can be dynamically generated (a new quest in this case) that sends the particular user to the desert location to complete an objective (e.g., defeat a particular creature) in order to obtain the reward (e.g., the more powerful sword).

Dynamically generating new unique quests can provide advantages in terms of game content utilization. For example, a typical player of a video game may only see a small percentage of the video game content while playing through a typical path in the game (e.g., a sequence of pre-defined quests from beginning to end). In the context of a multiplayer online video game, a player may only visit a portion of the available game world areas (e.g., less than 50% of the game world areas) while playing though the pre-defined quests and may only utilize a portion of other game resources (e.g., equipment such as armor and weapons). To try and solve this problem, previous solutions rely on creating new downloadable game content (DLC) which is a manual process requiring game developers to create the new DLC. Instead of manually creating new game content, the technologies described herein are used to dynamically create new unique quests. For example, if a particular player has not visited a specific area within the game world, a new unique quest can be created for the player to perform some action at the specific area. In this way, the original game content (e.g., areas in the virtual game world, equipment, weapons, armor, creatures, etc.) can be more fully utilized. In this way, the original game content can be more fully utilized by dynamically creating individual and/or group quests based game data including user-specific and/or aggregate telemetry data.

Dynamically generating new unique quests can provide advantages in terms of game performance. For example, problems can occur with multiplayer online video games when players congregate in a small number of locations (e.g., a specific city area, an area where a powerful item spawns, etc.). The problems can include server load problems (e.g., additional computing resources may be needed to handle the interaction of a large number of players in the same location), lag (e.g., players may experience low frame rates due to the large number of players close by), etc. In order to increase performance and/or to improve other aspects of the game (e.g., so that players, or groups of players, experience game content that they have not seen or used before) new unique quests can be dynamically created for a particular player and/or for a group of players. For example, if players are congregating in a particular area of the game world, new unique group quests can be created to send players to other areas of the game world (e.g., with appropriate rewards to motivate the players).

Dynamically generating new unique quests can provide advantages in terms of game balance. For example, problems can occur with multiplayer online video games when aspects of the game become unbalanced (e.g., game economy, items and equipment, kill rates for various creature types, etc.). In order to control game balance and improve the game experience, new unique quests can be dynamically created. For example, new unique quests can be dynamically created to improve game balance (e.g., by adjust rewards, drop rates, item prices, etc.).

In some implementations, combinations of telemetry data are used in order to dynamically create new unique quests. For example, telemetry data for a particular user can indicate that the particular user needs a specific item to advance in the game. Aggregate telemetry data from multiple users can indicate that there is a concentration of players in a particular area of the game world. In order to address these issues, a new unique quest can be dynamically generated for the particular user (e.g., alone or as a group quest) to send the user (or the group) to a different area of the game world (e.g., reducing the concentration in the particular area) with a quest reward of the particular item that the user needs (e.g., motivating the user to accept the quest).

Example Components and Operations for Dynamically Generating Interactive Experiences In the technologies described herein, new interactive experiences are dynamically created based at least in part on telemetry data. For example, new interactive experiences can be created based on telemetry data obtained from a particular user and/or based on telemetry data obtained from a group of users (e.g., aggregate telemetry data generated from a community of users of an online service). In some implementations, interactive content is dynamically generated for a computer game (e.g., for an online computer game or online video game).

FIG. 1 is a diagram depicting example components and operations 100 for telemetry based interactive content generation. For example, the components and operations 100 can be performed by one or more computing devices (e.g., by client computing devices, server computing devices, and/or cloud computing resources).

As depicted in FIG. 1, an interactive experience generator 120 receives various types of telemetry data 110 and service management data 115 (as depicted at 140). The telemetry data 110 can include user-specific telemetry data and aggregate telemetry data. In some implementations, the interactive experience generator 120 receives additional data describing the online service (e.g., online service state information).

The interactive experience generator 120 dynamically generates new interactive experiences 130 based at least in part on the telemetry data 110 and the service management data 115, as depicted at 142. For example, the interactive experience generator 120 can generate new activities for users to perform for the online service.

Figure 2:
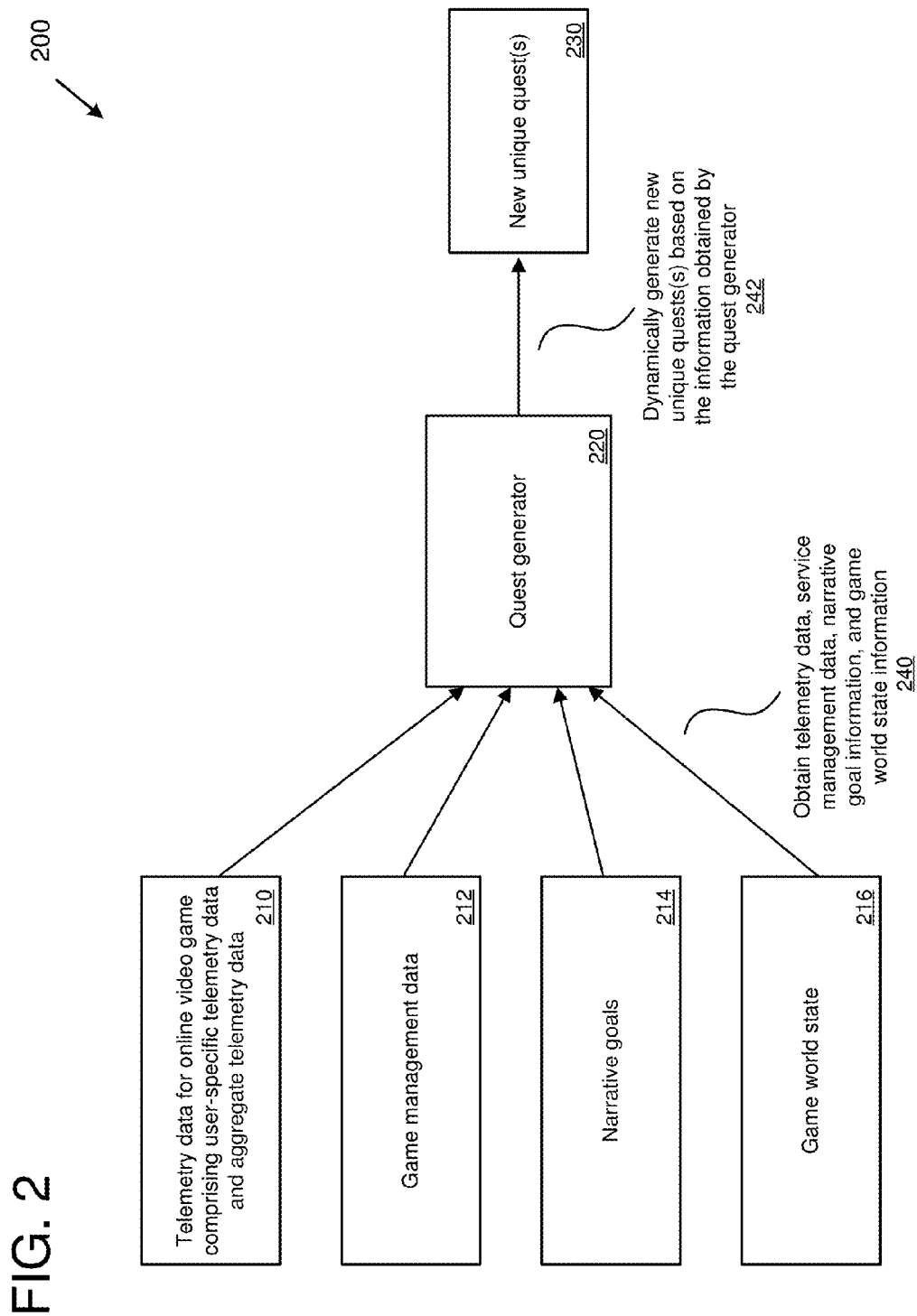
FIG. 2 is a diagram depicting example components and operations for telemetry based quest generation.

FIG. 2 is a diagram depicting example components and operations 200 for telemetry based quest generation. For example, the components and operations 200 can be performed by one or more computing devices (e.g., by client computing devices, server computing devices, and/or cloud computing resources).

As depicted in FIG. 2, a quest generator 220 receives (or obtains) a variety of data as input, as depicted at 240. The data can include telemetry data 210. The telemetry data 210 can include user-specific telemetry data and aggregate telemetry data. Telemetry data can include (for specific players and/or for groups in the aggregate) which locations players visit (e.g., which areas of a virtual world players has seen and/or not seen), which items players use (e.g., weapons, armor, and/or other inventory items), player attributes and statistics (e.g., what a particular player needs to advance in level), etc.

The data received by the quest generator 220 can also include game management data 212. Game management data can indicate the performance of various aspects of the online game, including where players are located in the virtual game world (e.g., to be used for load balancing), what items are being used by players (e.g., to be used for adjusting item drop rates), which quests are being selected by users (e.g., to be used for adjusting quest parameters, such as available quests, motivation, and rewards), what types of players are playing together in groups or not playing together (e.g., to be used to adjust matching players into groups), what is happening in the game economy, etc.

The data received by the quest generator 220 can also include narrative goals 214. The quest generator 220 uses the narrative goals 214 when creating a new unique quest and setting the parameters of the new unique quest. For example, the narrative goals 214 can be used when defining narrative information and/or motivation for the quest (e.g., that a town is under attack, to kill a band of raiding creatures, etc.). The narrative goals 214 can include specific names (e.g., names of non-players involved in the quest, creature names, location names, etc.), story line details (e.g., background information about a particular town, why it is being attacked, and what the player needs to do to save it), information defining a sequence of quests (e.g., a sequence of quests with a common story line), etc. While the narrative goals 214 are depicted as an input to the quest generator 220, narrative goals can also be output by the quest generator 220 (e.g., incorporated into the parameters of the new unique quests 230). The narrative goals 214 can also be implemented as a feedback loop (e.g., in which narrative details are fed back into the quest generator 220, which can be used as input when generating new quests or to support a sequence of quests with a common story line).

The data received by the quest generator 220 can also include game world state 216. The game world state 216 includes information defining the state of the game world, which can include status information of the various game world locations (e.g., towns, cities, and/or other areas of the virtual game world). The game world state 216 can also indicate the status of cities, towns, or other game world areas (e.g., the "health" of a particular area such as whether it is under the control of the players, whether it is under attack, whether players need to perform specific actions in a particular area to achieve a desired result, etc.). For example, the game world state 216 can indicate that a particular town is under attack and needs assistance. While the game world state 216 is depicted as an input to the quest generator 220, the game world state can also be output by the quest generator 220 (e.g., incorporated into the parameters of the new unique quests 230). The game world state 216 can also function as a feedback loop (e.g., in which game world state information is fed back into the quest generator 220, which can be used as input when generating new quests).

The quest generator 220 (also called a telemetry based procedural quest generator) dynamically generates new unique quests 230 based on the information obtained by the quest generator 220, as depicted at 242. For example, the quest generator 220 can generate one or more new unique quests 230 (e.g., an individual quest or a sequence of quests) for a particular player based on one or more types of input data (e.g., telemetry data 210, game management data 212, narrative goals 214, and/or game world state 216). The quest generator 220 can also generate one or more new unique quests 230 (e.g., an individual quest or a sequence of quests) for a group of players based on one or more types of input data (e.g., telemetry data 210, game management data 212, narrative goals 214, and/or game world state 216).

The new unique quests 230 can be defined by quest parameters. The quest parameters can include one or more areas of the game world, one or more actions for the user or group to perform, one or more quest narratives, and one or more in-game rewards. For example a new unique quest can be defined by quest parameters that direct a group of players to go to a particular town that is under attack, defeat a creature that is attacking the town, and receive a specific reward (e.g., new items that one or more players in the group need, experience, etc.).

Using the technologies described herein, various types of new unique quests can be generated using telemetry data as well as other types of data related to an online video game. For example, new unique quests can be dynamically generated based on how each player likes to play. In addition, the type of the new unique quest can be selected (e.g., from a set pre-defined quest types) based on the how the user plays (e.g., based on user-specific telemetry data). In a specific implementation, when the player opens their new quest they will get one of the following based on how they like to play the game. The below quest types can also be used for a group of players.

Default (for any player with an inconclusive amount of telemetry data collected): Kill any enemy you see in the game world. This quest type uses the player's normal tactics and skills to complete the objective whenever the player comes across these enemies in the world.

Defense Type: Defend the city from an enemy attack. Team up with artificial intelligence (AI) soldiers from the city to hold off the attack. This would give the players a defined location to go to with AI/other player support to help them complete the objective.

Stealth Type: Poison the resources that the enemies feed on. For this quest type, the players use stealth to destroy a large number of enemies all at once.

Dungeon/Group Type (raid objective for groups): Infiltrate the stronghold and overthrow the warlord there. With this quest type, game areas (e.g., dungeons) can be reused after they have been cleared by re-populating them with enemies to defeat. This can challenge the player to do it alone or with a group, like a mini MMO raid.

Example Environment for Dynamically Generating Interactive Experiences

In the technologies described herein, environments can be provided for dynamically generating new interactive experiences based at least in part on telemetry data. Such environments can include computing devices (e.g., client devices, server devices, etc.) and other types of computing resources (e.g., networks, cloud computing resources, etc.). Other types of data can also be used in dynamically generating new interactive experiences, such as service management data. In some implementations, new unique quests are generated using a combination of one or more of: telemetry data, game management data, narrative goals, and game world state.

Figure 3:
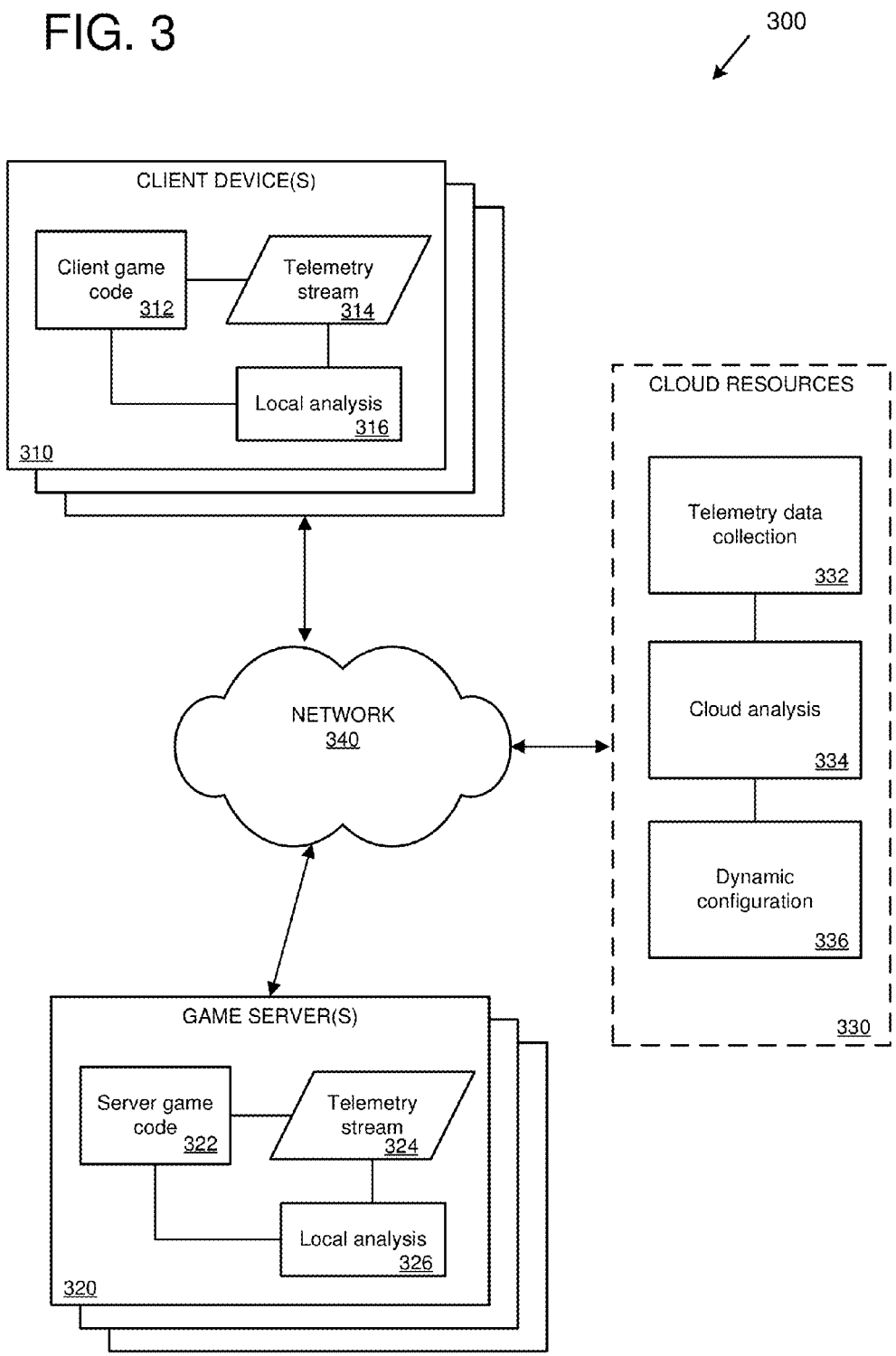
FIG. 3 is a diagram depicting an example environment for dynamically generating interactive experiences using telemetry data.

FIG. 3 is a diagram depicting an example environment 300 for dynamically generating new unique quests for an online video game using telemetry data (separately or in combination with other types of data). As depicted in the example environment 300, operation of the online video game involves different types of computing resources connected via a network 340 (e.g., comprising local area networks, wide area networks, public networks, private networks, the Internet, etc.). Specifically, one or more client devices 310 run client game code 312, one or more game servers 320 run server game code 322, and cloud resources (e.g., cloud computing resources, cloud storage, etc.) perform other operations in support of the online video game.

As depicted in the example environment 300, telemetry data is collected at various locations. For example, a stream of telemetry data 314 produced by the client game code 312 can be obtained at a client device (one of client devices 310). A local analysis 316 component can analyze the stream of telemetry data 314 at the client device.

For example, a stream of telemetry data 314 can be produced by the client game code 312 while a player plays the online video game using the client device (e.g., the player's laptop, desktop, tablet, smart phone, or other type of computing device). The stream of telemetry data 314 can include user-specific telemetry data for the player of the online video game (e.g., areas of the game world that the player visits, items and equipment that the player uses, quests that the player completes, creatures that the user kills, etc.).

The stream of telemetry data 314 can be analyzed locally by the local analysis 316 component to process the steam of telemetry data 314. For example, the local analysis 316 component can track the locations that the user visits in the game world (e.g., maintain a list of the areas), track user needs (e.g., items or other rewards that the user needs to complete a quest or increase in level), etc. Current and/or historic telemetry data can be stored locally and/or provided to other devices and resources (e.g., provided to the game servers 320 and/or cloud resources 330).

A stream of telemetry data 324 can also be produced by the server game code 322 running on a game server (one of the game servers 320). For example, the stream of telemetry data 324 can include telemetry data generated by activity performed by one or more players of the online video game. The telemetry data can be maintained as user-specific telemetry data and/or aggregate telemetry data. For example, a local analysis 326 component at the game server can receive the stream of telemetry data 324, maintain user-specific telemetry data, generate aggregate telemetry data, and provide telemetry data to other destinations (e.g., to the cloud resources 330).

Cloud resources 330 can receive telemetry data (e.g., user-specific and/or aggregate telemetry data) from the client devices 310 and the game servers 320. For example, a telemetry data collection 332 component can receive the stream of telemetry data 314 from the local analysis 316 component. The telemetry data collection 332 component can also receive the stream of telemetry data 324 from the local analysis 326 component. The cloud resources 330 can perform analysis operations using the received telemetry data. For example, a cloud analysis 334 component can analyze the telemetry data (separately or in combination with other game data, such as game management data, narrative goals, and game world state). The cloud analysis 334 component can determine quest parameters for new unique quests (e.g., quests for a particular player and/or quests for groups of players) based on the collected telemetry data alone or in combination with other types of data (e.g., game management data, narrative goals, and game world state). The cloud resources 330 can dynamically generate new unique quests using the dynamic configuration 336 component. For example, the dynamic configuration 336 component can provide new unique quest details to the game servers 320 and/or to the client devices 310.

In some implementations, different types of analysis are performed at the different locations. User-specific analysis can be performed at the client devices 310. For example, user-specific telemetry data can be used to determine user-specific goals and objectives (e.g., locations, actions, narrative details, and/or rewards for a specific player can be determined based on the specific player's telemetry data, alone or in combination with other types of data). Group analysis can be performed at the game servers 320. For example, telemetry data from multiple players (e.g., all game players, players using a particular game server, players currently grouped together, etc.) can be used to determine collective goals and objectives (e.g., goals and objectives for players in a group, for players using a particular game server, or for all players of the game). Global analysis can be performed at the cloud resources 330. For example, user-specific telemetry data collected from the client devices 310 and aggregate telemetry data collected from the game servers 320 can be used to drive global goals and objectives (e.g., new unique quests can be created by the cloud resources 330 to balance player load across the game servers 320 or to balance players across areas of the game world).

Example Dynamic Interactive Content Generation Scenarios

In the technologies described herein, various types of interactive experiences can be dynamically generated using telemetry data, alone or in combination with other types of data such as service management data. In the context of an online video game, new unique quests can be dynamically generated using telemetry data, alone or in combination with other types of data such as game management data, narrative goals, and game world state.

Below are described a number of example ways in which new unique quests can be generated within the context of an online video game. In the below examples, an objective of the quest is defined as follows: kill X enemies of type Y in location Z in time T using weapon W.

In a first example using the above objective, ways of dynamically selecting Y (enemy type) are described. The first examples uses telemetry data including kills by enemy type and deaths by enemy type.

First example, Option 1: preferred enemy type (e.g., find the enemy type for which the player has the best kill/death ratio):
Initialize Y to empty enemy type
Initialize best kill/death ratio to 0
For each enemy type:
  If lifetime kill count>N (e.g., where N is a pre-determined threshold)
    Calculate kill/death ratio
    If kill/death ratio>best kill/death ratio
      Set best kill/death ratio=kill/death ratio
      Set Y=current enemy type First example, Option 2: most challenging enemy type (e.g., find the enemy type for which the player has the worst kill/death ratio):
Initialize Y to empty enemy type
Initialize worst kill/death ratio to MAX_INT
For each enemy type
  If lifetime kill count>N
    Calculate kill/death ratio
    If kill/death ratio<best kill/death ratio
      Set worst kill/death ratio=kill/death ratio
      Set Y=current enemy type In a second example using the above objective, ways of dynamically selecting X (number of enemies to kill) given Y and T (enemy type and time) are described. The second examples uses telemetry data including kills by enemy type. The second example is defined by the following equation (e.g., where challenge factor is a pre-defined multiplier):

Set $X$=(sum(kills where enemy size=size of type $Y$)
  over most recent window of length $T$)*challenge factor In a third example using the above objective, ways of dynamically selecting Z (location) given Y and T (enemy type and time) are described. The third example uses telemetry data including player locations (e.g., current location of the players in the game world).

Third example, Option 1: most popular location (e.g., find the location with the most players in which the enemy type is located):
Initialize Z to empty location
Initialize max heartbeat count to 0 (where a heartbeat indicates a player)

For each location
    If enemy type Y exists in current location
        Count heartbeats in current location over most recent window of length T
        If heartbeat count>max heartbeat count
            Set Z=current location
            Set max heartbeat count=current heartbeat count Third example, Option 2: least popular location (e.g., find the location with the least number of players in which the enemy type is located):
Initialize Z to empty location
Initialize min heartbeat count to MAX_INT
For each location
    If enemy type Y exists in current location
        Count heartbeats in current location over most recent window of length T
        If heartbeat count<min heartbeat count
            Set Z=current location
            Set max heartbeat count=current heartbeat count In a fourth example using the above objective, ways of dynamically selecting W (weapon used) given T (time) are described. The fourth examples uses telemetry data including which weapons are used.

Fourth example, Option 1: most popular weapon (e.g., determine which weapon is used most frequently):
Initialize W to empty weapon
Initialize max use count to 0
For each weapon type
    Count weapon use over most recent window of length T
    If use count>max use count
        Set W=current weapon
        Set max use count=current use count Fourth example, Option 2: least popular weapon (e.g., determine which weapon is used least frequently):
Initialize W to empty weapon
Initialize min use count to MAX_INT
For each weapon type
    Count weapon use over most recent window of length T
    If use count<min use count
        Set W=current weapon
        Set max use count=current use count The above four examples illustrate different algorithms for dynamically determining different parameters for dynamically generating new unique quests. The example algorithms can be implemented by one component of the online video game (e.g., by a quest generator component of a game server or a cloud computing quest generator component). The example algorithms can also be distributed. For example, a client device can perform some of the operations (e.g., determine some of the parameters using local user-specific telemetry data) and the results of which can be sent to the game servers or cloud resources and combined with other telemetry data (e.g., aggregate telemetry data) for dynamically generating the new unique quests. For example, with reference to FIG. 3, the parameter Y (enemy type) could be determined (e.g., as described above in the first example) by the local analysis 316 component while the parameter Z (location) could be determined (e.g., as described above in the third example) by the local analysis 326 component of the game server. Yet other parameters could be determined at the cloud resources 330. Using this approach, new unique quests can be generated using telemetry data, quest parameters, and/or other types of data generated by, or obtained from, various devices and resources of the online video game environment.

In some implementations, players are dynamically matched and grouped together when dynamically generating new unique quests. In one example scenario, telemetry data (e.g., user-specific telemetry data) is analyzed to identify a player that is good at killing a particular type of creature and a player that is not good at killing a particular type of creature. A new unique quest can be generated that matches the players together (alone or with other players) so that the particular type of creature can be completed (e.g., with the weaker player in a supporting or learning role).

In another example scenario, telemetry data is analyzed to determine that a particular creature (e.g., a particular boss) has not been defeated recently or that a particular location (e.g., a specific area of the game world) has not been visited recently. A new unique quest can then be generated to defeat the particular creature located at the particular location.

In another example scenario, telemetry data is analyzed in order to adjust the game world economy. For example, if the ratio of red gems to blue gems is too high (e.g., above a pre-determined threshold), drop rates can be adjusted, new unique quests can be dynamically generated to defeat creatures that drop blue gems or that offer blue gems as rewards, or players can be matched based on which type of gems they have (e.g., players with lots of blue gems can be matched with players that have few blue gems to promote trading).

Methods for Telemetry Based Interactive Content Generation

In any of the examples herein, methods can be provided for performing telemetry based interactive content generation for online services. For example, new interactive experiences can be dynamically generated for an online service using telemetry data (e.g., alone or in combination with other types of data, such as service management data). As another example, new online quests can be dynamically generated for an online video game using telemetry data (e.g., alone or in combination with other types of data, such as game management data, narrative goals, and game world state)

Figure 4:
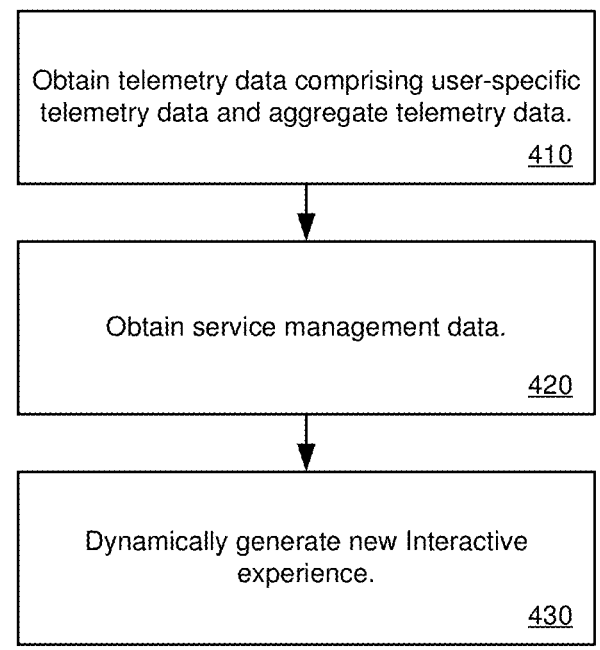
FIG. 4 is a flowchart of an example method for performing telemetry based interactive content generation for an online service.

FIG. 4 is a flowchart of an example method 400 for performing telemetry based interactive content generation for an online service. At 410, telemetry data is obtained. The telemetry data comprises user-specific telemetry data that is specific to a user of the online service and aggregate telemetry data that is generated from a plurality of users of the online service.

At 420, service management data is obtained. The service management data can be generated from the plurality of users of the online service. In some implementations, the service management data comprises user density information for virtual areas of the online service.

At 430, a new interactive experience is dynamically generated. The new interactive experience is dynamically generated using, at least in part, the telemetry data and the service management data.

Figure 5:
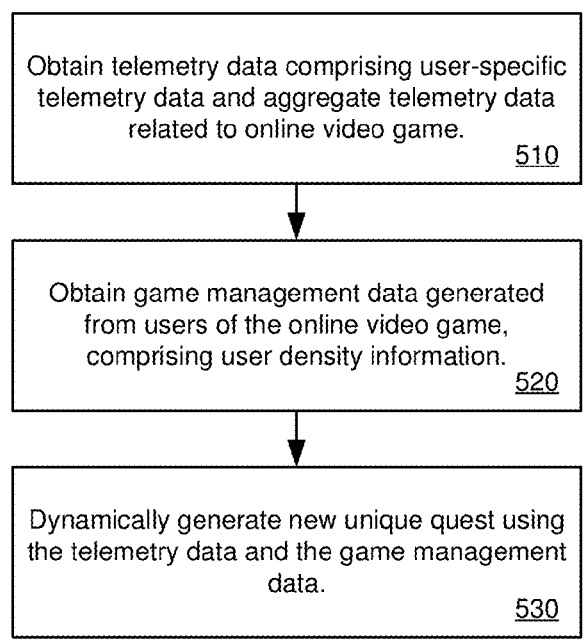
FIG. 5 is a flowchart of an example method for performing telemetry based quest generation for an online video game.

FIG. 5 is a flowchart of an example method 500 for performing telemetry based interactive content generation for an online service. Specifically, the example method 500 dynamically generates new unique quests for an online video game service.

At 510, telemetry data is obtained. The telemetry data comprises user-specific telemetry data that is specific to a user of the online video game and aggregate telemetry data that is generated from a plurality of users of the online video game.

At 520, game management data is obtained. The game management data is generated from the users of the online video game. In some implementations, the game management data comprises user density information for areas of a virtual game world of the online video game.

At 530, a new unique quest is dynamically generated. The new unique quest is dynamically generated using, at least in part, the telemetry data and the game management data.

In some implementations, a new unique quest is dynamically generated (e.g., as depicted at 530) based at least in part on user-specific telemetry data that comprises locations in a game world that the specific user has visited. For example, the location for the new unique quest can be set by determining an area in the game world that the specific user has not visited.

In some implementations, a new unique quest is generated for a group of users in an online video game. For example, the group of users can be matched for inclusion in the group quest based, at least in part, on telemetry data of the users being matched. For example, the users can be matched based on their levels or abilities, based on their play style, based on the type of quest they like to complete, based on the rewards that they need, etc.

In some implementations, the telemetry data is generated by different sources. For example, the user-specific telemetry data can be generated by a client device of the specific user running client game code and the aggregate telemetry data can be generated by a game server running server game code. The telemetry data can also comprise global telemetry data (e.g., generated by game servers or cloud resources). The global telemetry data can indicate global game world trends of the online video game (e.g., global changes in economy, player attributes, player activities, etc.).

In some implementations, a new unique quest is dynamically generated to load balance users of a game world of an online video game based at least in part on user density information for areas of the game world. For example, the quest can be generated by determining which areas of the game world are most populated and/or least populated based on current user counts of the areas of the game world and selecting one of the least populated areas as the location for the new unique quest.

Figure 6A:
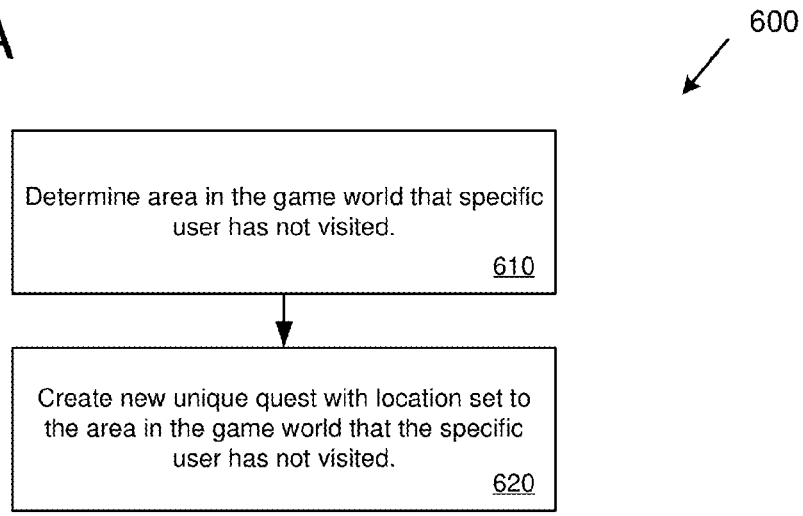
FIGS. 6A and 6B are flowcharts of example methods for dynamically generating new unique quests for an online video game.

FIG. 6A is a flowchart of an example method 600 for dynamically generating new unique quests for an online video game. At 610, an area in the game world that a specific user has not visited is determined The area in the game world that the specific user has not visited is determined based on user-specific telemetry data that indicates which areas the specific user has (or has not) visited in the game world.

At 620, a new unique quest is created with a location set (e.g., via a location parameter) to the area in the game world that the specific user has not visited.

The example method 600 is described in terms of dynamically creating a new unique quest for a specific user based on that user's telemetry data. However, the method can also be applied to a group of users. For example, a new unique quest for a group of users (e.g., a group of players that have been matched and placed into a group) can be created based on user-specific telemetry data for the users in the group (e.g., the location for the quest can be set to a location that most of the players have not visited in the game world, or that none of the players have visited).

Figure 6B:
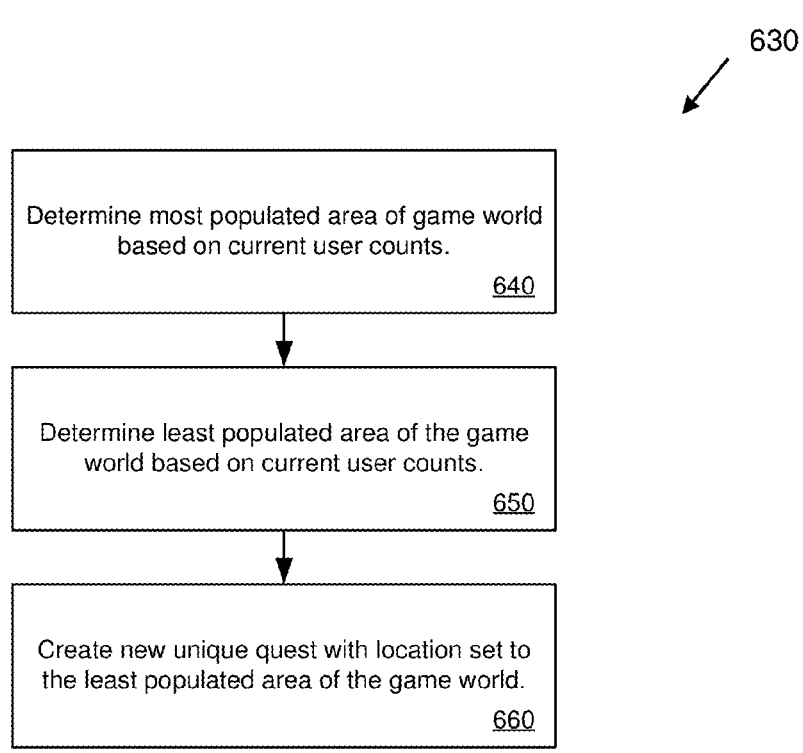

FIG. 6B is a flowchart of an example method 630 for dynamically generating new unique quests for an online video game. The example method 630 can be performed to load balance users of the online video game based on user density information (also called user population) for areas (also called virtual areas) of the virtual world.

At 640, a most populated virtual area of the game world is determined based on current user counts for the areas of the game world. At 650, a least populated virtual area of the game world is determined based on the current user counts. At 660, a new unique quest is dynamically created with a location set to the least populated area of the game world.

Computing Systems

Figure 7:
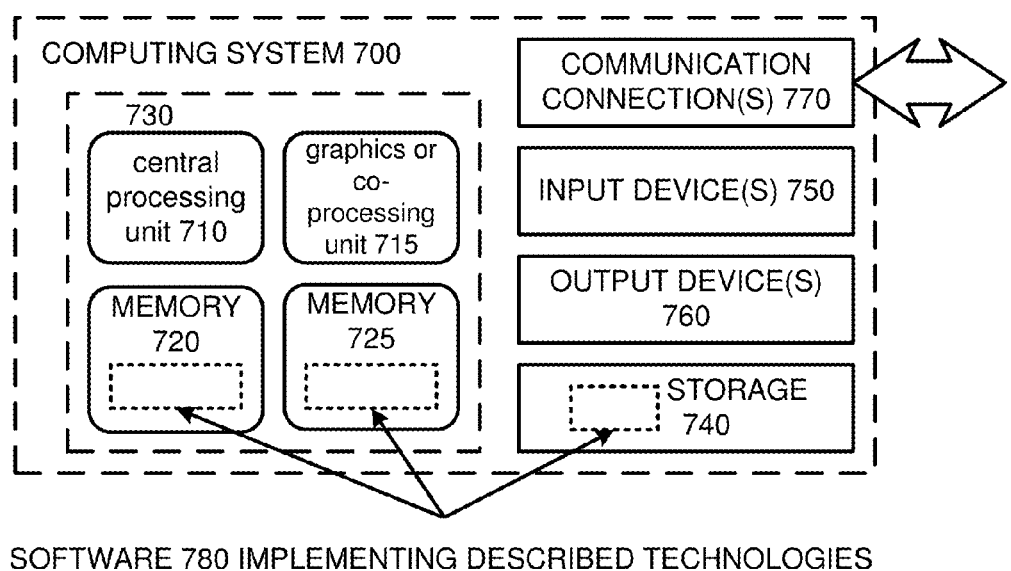
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
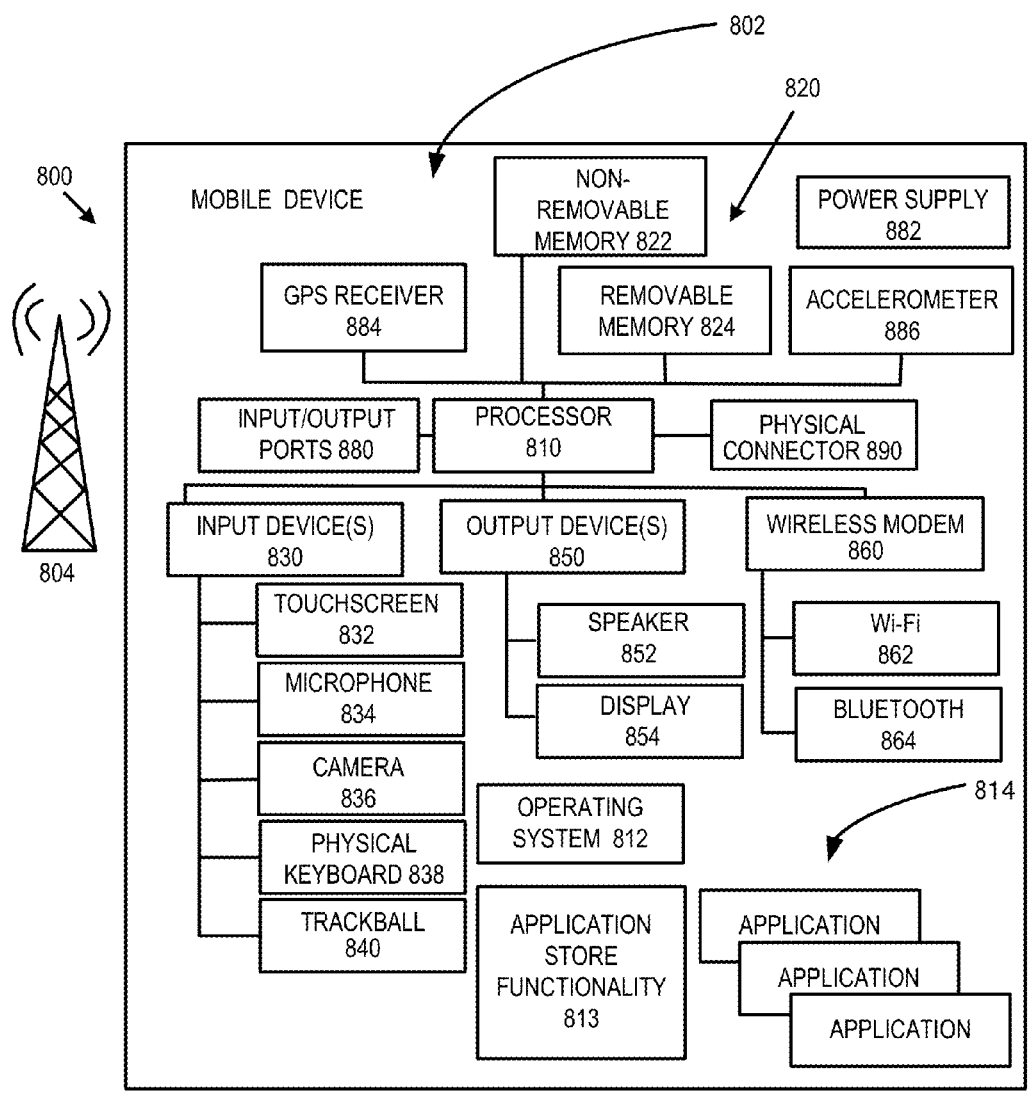
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye , and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

Figure 9:
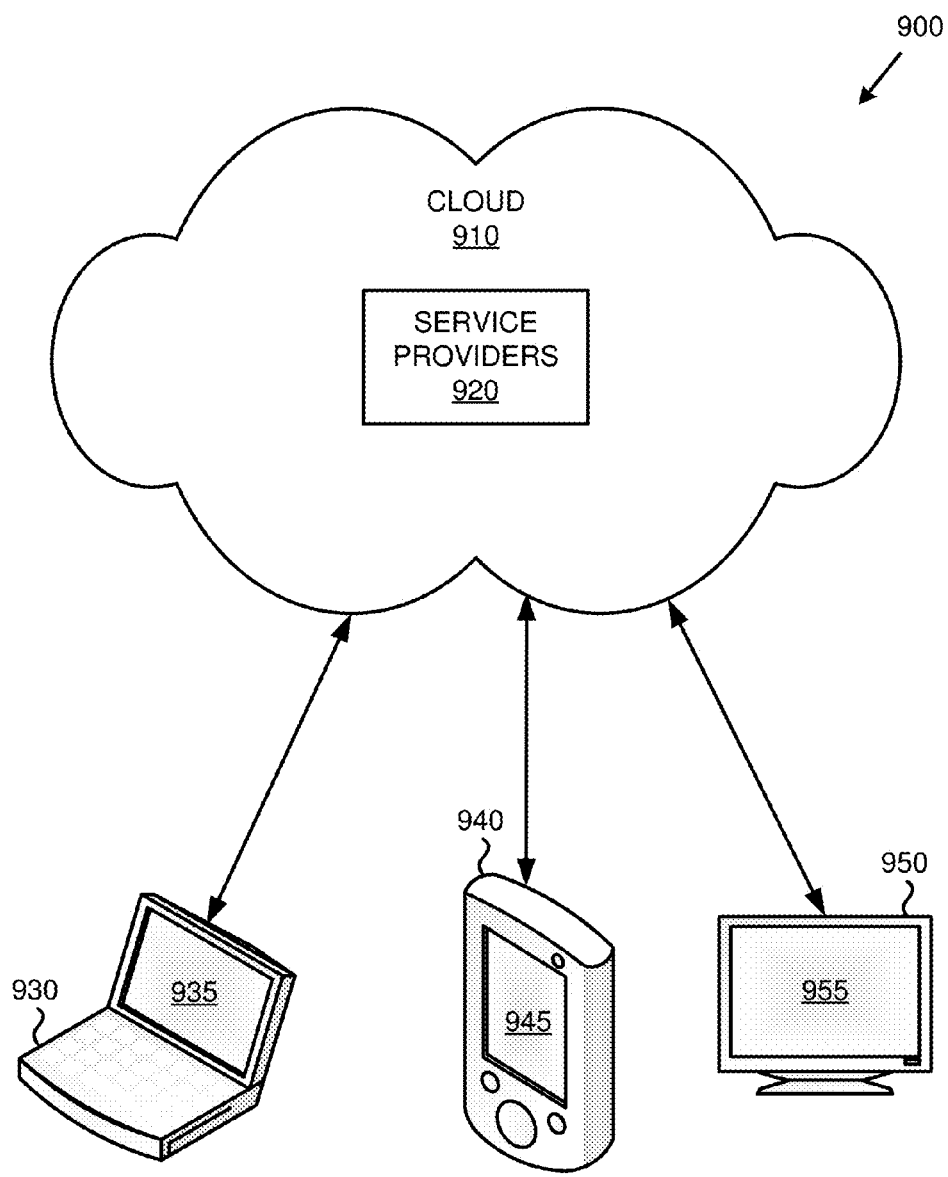
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections (e.g., 770, 860, 862, and 864).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
 a processing unit; and
 memory;
 the computing device configured to perform operations for telemetry based interactive content generation for an online service, wherein the online service is an online video game that takes place in a game world, the operations comprising:
  obtaining telemetry data, wherein the telemetry data comprises:
   user-specific telemetry data that is specific to a specific user of the online service; and
   aggregate telemetry data that is generated from a plurality of users of the online service;
  obtaining service management data, wherein the service management data is generated from the plurality of users of the online service, and wherein the service management data comprises user density information for virtual areas of the online service; and
  dynamically generating a new unique quest in the online video game based at least in part on the telemetry data and the service management data:
   wherein the new unique quest is dynamically generated, without manual intervention, to load balance users of the game world based at least in part on the user density information for virtual areas of the game world of the online video game, and wherein the new unique quest is not one of a set of pre-defined quests provided with the online video game.

2. The computing device of claim 1 wherein the user-specific telemetry data comprises:
 telemetry data generated from activity performed by the specific user when using the online service; and
 telemetry data generated from attributes of the specific user.

3. The computing device of claim 1 wherein the aggregate telemetry data comprises:
 telemetry data generated from activity performed by the plurality of users when using the online service.

4. The computing device of claim 1 wherein the user-specific telemetry data comprises locations in the game world that the specific user has visited;
 wherein dynamically generating the new unique quest comprises:
  determining an area in the game world that the specific user has not visited based on the user-specific telemetry data; and
  setting a quest location for the new unique quest to the area in the game world that the specific user has not visited.

5. The computing device of claim 1 wherein the service management data further comprises:
 virtual economy information for the online video game.

6. The computing device of claim 1 wherein the new unique quest is defined by quest parameters comprising:
 one or more virtual areas of a game world of the online video game;
 one or more actions to perform;
 one or more quest narratives; and
 one or more in-game rewards.

7. The computing device of claim 1 wherein the new unique quest for a group of users in the online video game, and wherein dynamically generating the new unique quest comprises:
 matching the specific user with one or more additional users to form the group of users for the new unique quest, wherein the matching is performed, at least in part, using the user-specific telemetry data for the specific user and user-specific telemetry data for the one or more additional users.

8. The computing device of claim 1 wherein the user-specific telemetry data is obtained from a client computing device associated with the specific user, wherein the aggregate telemetry data is obtained from a server computing device running the online video game, and wherein the telemetry data further comprises:
 global telemetry data indicating global game world trends of the online video game.

9. A method, implemented by a computing device, for telemetry based interactive content generation for an online video game that takes place in a game world, the method comprising:
 obtaining telemetry data, wherein the telemetry data comprises:
  user-specific telemetry data that is specific to a specific user of the online service; and
  aggregate telemetry data that is generated from a plurality of users of the online service;
 obtaining service management data, wherein the service management data is generated from the plurality of users of the online service, and wherein the service management data comprises user density information for virtual areas of the online service; and
 dynamically generating a new unique quest in the online video game based at least in part on the telemetry data and the service management data:
  wherein the new unique quest is dynamically generated, without manual intervention, to load balance users of the game world based at least in part on the user density information for virtual areas of the game world of the online video game, and wherein the new unique quest is not one of a set of pre-defined quests provided with the online video game.

10. The method of claim 9 wherein the user-specific telemetry data comprises:
 telemetry data generated from activity performed by the specific user when using the online service; and
 telemetry data generated from attributes of the specific user; and
 wherein the aggregate telemetry data comprises:
  telemetry data generated from activity performed by the plurality of users when using the online service.

11. The method of claim 9 wherein the user-specific telemetry data comprises locations in the game world that the specific user has visited;

wherein dynamically generating the new unique quest comprises:
- determining an area in the game world that the specific user has not visited based on the user-specific telemetry data; and
- setting a quest location for the new unique quest to the area in the game world that the specific user has not visited.

12. The method of claim 9 wherein the service management data further comprises:
- virtual economy information for the online video game.

13. The method of claim 9 wherein the new unique quest is defined by quest parameters comprising:
- one or more virtual areas of a game world of the online video game;
- one or more actions for the specific user to perform;
- one or more quest narratives; and
- one or more in-game rewards.

14. The method of claim 9 wherein the user-specific telemetry data is obtained from a client computing device associated with the specific user, wherein the aggregate telemetry data is obtained from a server computing device running the online video game, and wherein the telemetry data further comprises:
- global telemetry data indicating global game world trends of the online video game, wherein the global telemetry data is obtained from a cloud-based telemetry analysis component.

15. A computer-readable storage medium storing computer-executable instructions for causing a computing device to perform operations for telemetry based interactive content generation for an online video game that takes place in a game world, the operations comprising:
- obtaining telemetry data, wherein the telemetry data comprises:
  - user-specific telemetry data that is specific to a specific user of the online service;
  - aggregate telemetry data that is generated from a plurality of users of the online service; and
  - global telemetry data indicating global trends of the online service;
- obtaining service management data, wherein the service management data is generated from the plurality of users of the online service, and wherein the service management data comprises user density information for virtual areas of the online service; and
- dynamically generating a new unique quest in the online video game based at least in part on the telemetry data and the service management data;
- wherein the new unique quest is dynamically generated, without manual intervention, to load balance users of the game world based at least in part on the user density information for virtual areas of the game world of the online video game, and wherein the new unique quest is not one of a set of pre-defined quests provided with the online video game.

16. The computer-readable storage medium of claim 15 wherein the user-specific telemetry data comprises:
- telemetry data generated from activity performed by the specific user when using the online service; and
- telemetry data generated from attributes of the specific user; and
wherein the aggregate telemetry data comprises:
- telemetry data generated from activity performed by the plurality of users when using the online service.

17. The computer-readable storage medium of claim 15 wherein the user-specific telemetry data comprises locations in the game world that the specific user has visited;
wherein dynamically generating the new unique quest comprises:
- determining an area in the game world that the specific user has not visited based on the user-specific telemetry data; and
- setting a quest location for the new unique quest to the area in the game world that the specific user has not visited.

18. The computer-readable storage medium of claim 15 wherein dynamically generating a new unique quest comprises:
- determining a most populated virtual area of the game world based on current user counts for the virtual areas;
- determining a least populated virtual area of the game world based the on current user counts of the virtual areas; and
- setting a quest location for the new unique quest to the least populated virtual area of the game world.

* * * * *